United States Patent
Niday et al.

(10) Patent No.: US 10,829,650 B2
(45) Date of Patent: Nov. 10, 2020

(54) HIGH TEMPERATURE DRY FILM LUBRICANT

(71) Applicant: General Electric Company, Schenectady, NY (US)

(72) Inventors: David Andrew Niday, Springboro, OH (US); Vicky S. Budinger, Loveland, OH (US); Martin M. Morra, Niskayuna, NY (US); Hong Zhou, Shanghai (CN); Qijia Fu, Shanghai (CN); Yanfei Gu, Shanghai (CN); Shizhong Wang, Shanghai (CN); Xiaxi Li, Shanghai (CN)

(73) Assignee: General Electric Company, Chenectady, NY (US)

( * ) Notice: Subject to any disclaimer, the term of this patent is extended or adjusted under 35 U.S.C. 154(b) by 0 days.

(21) Appl. No.: 16/465,623

(22) PCT Filed: Oct. 13, 2017

(86) PCT No.: PCT/US2017/056437
§ 371 (c)(1),
(2) Date: May 31, 2019

(87) PCT Pub. No.: WO2018/106341
PCT Pub. Date: Jun. 14, 2018

(65) Prior Publication Data
US 2019/0315976 A1    Oct. 17, 2019

(30) Foreign Application Priority Data

Dec. 9, 2016  (CN) .......................... 2016 1 1128477

(51) Int. Cl.
*C09D 7/61*    (2018.01)
*C09D 7/63*    (2018.01)
(Continued)

(52) U.S. Cl.
CPC .................. *C09D 7/61* (2018.01); *C08K 3/04* (2013.01); *C08K 3/08* (2013.01); *C08K 3/32* (2013.01);
(Continued)

(58) Field of Classification Search
CPC .......... C10M 177/00; C10M 2209/105; C10N 2050/02; C08L 63/04; C08K 3/04;
(Continued)

(56) References Cited

U.S. PATENT DOCUMENTS 2,294,817 A    9/1942   Van Dijck
3,102,862 A    9/1963   Green
(Continued)

FOREIGN PATENT DOCUMENTS

CN    101644142 A    2/2010
CN    105308339 A    2/2016
(Continued)

OTHER PUBLICATIONS

International Search Report Corresponding to Application No. PCT/US2017/056437 dated Feb. 8, 2018.
(Continued)

*Primary Examiner* — James C Goloboy
(74) *Attorney, Agent, or Firm* — Dority & Manning, P.A.

(57) ABSTRACT

A coating precursor slurry is provided, along with its methods of formation and use. The coating precursor slurry may include an organic binder comprising a polymeric component and a hardening reagent; an inorganic binder comprising an aluminum-nitrogen compound, a barium-containing organic compound, a nickel-containing organic compound, an ammonia polyphosphate, and phosphorus pentoxide; active components comprising Mo, Te, and graphite; and a solvent.

20 Claims, 2 Drawing Sheets

(51) Int. Cl.
*C08K 3/04* (2006.01)
*C08K 3/08* (2006.01)
*C08K 3/32* (2006.01)
*C08K 5/098* (2006.01)
*C08K 5/17* (2006.01)
*C08K 5/56* (2006.01)
*C08L 63/04* (2006.01)
*C10M 177/00* (2006.01)
*C10N 50/02* (2006.01)

(52) U.S. Cl.
CPC .............. *C08K 5/098* (2013.01); *C08K 5/17* (2013.01); *C08K 5/56* (2013.01); *C08L 63/04* (2013.01); *C09D 7/63* (2018.01); *C10M 177/00* (2013.01); *C08K 2003/323* (2013.01); *C10M 2209/105* (2013.01); *C10N 2050/02* (2013.01)

(58) Field of Classification Search
CPC . C08K 3/08; C08K 3/32; C08K 5/098; C08K 5/17; C08K 5/56; C08K 2003/323; C09D 7/61; C09D 7/63
See application file for complete search history.

(56) References Cited

U.S. PATENT DOCUMENTS

| | | | |
|---|---|---|---|
| 3,130,158 A | 4/1964 | Daly, Jr. | |
| 4,778,637 A | 10/1988 | Adams et al. | |
| 5,356,545 A | 10/1994 | Wayte | |
| 5,518,683 A | 5/1996 | Taylor et al. | |
| 5,682,596 A | 10/1997 | Taylor et al. | |
| 7,093,419 B2 | 8/2006 | McCaffrey et al. | |
| 7,997,386 B2 | 8/2011 | Gillott et al. | |
| 8,460,750 B2 | 6/2013 | Jensen et al. | |
| 2009/0030113 A1* | 1/2009 | Glockner | C08L 2666/16 523/160 |
| 2009/0155017 A1 | 6/2009 | Wittman | |
| 2012/0245063 A1* | 9/2012 | DiBiase | C08F 20/14 508/178 |
| 2016/0076587 A1 | 3/2016 | Chitose et al. | |
| 2017/0275459 A1* | 9/2017 | Hewel | C08L 77/06 |

FOREIGN PATENT DOCUMENTS

| | | | | |
|---|---|---|---|---|
| CN | 105950007 A | | 9/2016 | |
| DE | 102006000645 A1 | * | 7/2007 | ............. C08L 61/06 |
| DE | 102006000645 A1 | | 7/2007 | |
| EP | 3222649 A1 | * | 9/2017 | ............... C08K 7/14 |
| EP | 3222649 A1 | | 9/2017 | |

OTHER PUBLICATIONS

Chinese Search Report Corresponding to Application No. 201611128477 dated Dec. 2, 2019.
www.tiodize.com, Huntington Beach, California.

* cited by examiner

HIGH TEMPERATURE DRY FILM LUBRICANT

FIELD

The present invention generally relates to a dry film lubricant and anti-seize coating for use in metal components used at high temperatures. In particular, a dry film lubricant and anti-seize coating is generally provided for use in high temperature applications, such as in gas turbine engines.

BACKGROUND

Turbine engines require fasteners to assemble the various components and modules together as a working machine. The operation of these turbines exposes high temperatures and corrosive and contaminated materials to these fasteners. The combined joints of nuts and bolts in this environment, if unprotected, can seize by oxidation and/or gall resulting in high breakaway and running torques or binding of the fasteners. In some cases fasteners can break during disassembly.

Dry film anti-seize lubricant coatings aid in fastener removal and reusability after these turbine environment exposures. These dry film anti-seize lubricant coated parts are significantly less oxidized or corroded and maintain lower breakaway and running torques and fewer broken fasteners on disassembly. However, current dry film anti-seize lubricant coatings do not meet many of the desired properties for extended use through several engine repair cycles. As such, a need exists for an improved dry film anti-seize lubricant coating.

BRIEF DESCRIPTION

Aspects and advantages of the invention will be set forth in part in the following description, or may be obvious from the description, or may be learned through practice of the invention.

A coating precursor slurry is generally provided, along with its methods of formation and use. In one embodiment, the coating precursor slurry includes an organic binder comprising a polymeric component and a hardening reagent; an inorganic binder comprising an aluminum-nitrogen compound, a barium-containing organic compound, a nickel-containing organic compound, an ammonia polyphosphate, and phosphorus pentoxide; active components comprising Mo, Te, and graphite; and a solvent.

In one embodiment, a method of applying a lubricant composition onto a component is generally provided, that can include applying the coating precursor slurry of claim 1 onto a surface of the component; heating the coating precursor slurry on the component to a drying temperature of about 220° C. to about 260° C. to remove any solvent to form a dried coating precursor; and heating the dried coating precursor on the component to a curing temperature of about 525° C. to about 600° C. to cure the dried coating precursor.

In one embodiment, a method of forming a coating precursor slurry is generally provided that includes mixing a first solution and a second solution to form a slurry, wherein the first solution comprises an aluminum-nitrogen compound and phosphorus pentoxide in a first solvent, and wherein the second solution comprises phosphorus pentoxide, a barium-containing organic compound, an aluminum-nitrogen compound, and a nickel-containing organic compound in a second solvent; and adding an ammonia polyphosphate, an organic binder, graphite, and molybdenum ditelluride to the slurry.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
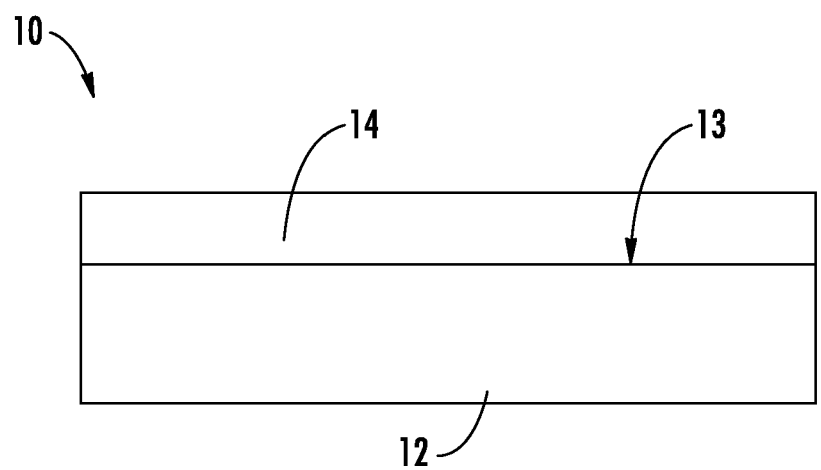
FIG. 1 shows a coating precursor slurry applied onto a surface of a component, according to an embodiment of the present invention.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth. The term "compound" is used herein to refer to a molecular structure of individual elements bonded together. For example, $AlPO_4$ is a compound of Al, P, and O.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

The term "organic" is used herein to refer to a class of chemical compounds that are comprised of carbon atoms in a non-crystalline form. For example, an "organic polymer" is a polymer that includes carbon atoms in the polymer backbone, but may also include other atoms either in the polymer backbone and/or in side chains extending from the polymer backbone (e.g., oxygen, nitrogen, sulfur, etc.). It is noted that graphite, which is a crystalline form of carbon, is not considered an organic material under this definition.

As used herein, the term "substantially free" means no more than an insignificant trace amount present and encompasses completely free (e.g., 0 molar % up to 0.01 molar %).

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

A high temperature dry film anti-seize lubricant coating and material is generally provided, along with its methods of manufacture and use. In one embodiment, the dry film anti-seize lubricant coating and material maintains the function and reusability of coated parts after exposure to high temperature corrosive turbine operating environments. For example, the high temperature dry film anti-seize lubricant coating provides anti-seize coated components with contacting wear surfaces or static pressure faces, and thus provides protection against corrosion, seizing, and wear of the mating surfaces of the protected components. Additionally, the coatings seal and protect the coated material from the corrosive gases and contamination common to a turbine engine environment. A typical application is the mating threads, flanges, and face pressure surfaces of nuts and bolts. The dry film lubricant coating provides a lubricant surface with a low coefficient of friction assuring low assembly and with anti-seize disassembly torques. As such, when utilized within an engine (e.g., a gas turbine engine), the dry film anti-seize lubricant material can reduce maintenance costs and engine assembly and disassembly cycles, effectively reducing the cost of engine ownership.

Generally, the dry film lubricant coating includes an inorganic binder, a molybdenum component, and a tellurium component, although additional components may also be included as discussed below. In one embodiment, the molybdenum component and the tellurium component are the same, single component (e.g., a molybdenum telluride). The molybdenum and tellurium generally serve as active components that provide the lubricating and anti-seize properties of the coating. The dry film coating is generally formed from a coating precursor slurry that also contains an organic component.

In one embodiment, the dry film lubricant coating is a high temperature dry film anti-seize lubricant material useful for components that operate at temperatures from about −50° C. to about 760° F., such as seen during operation of turbo machinery (e.g., gas turbine engines).

As shown in the exemplary embodiment of FIG. 1, a lubricated anti-seize component 10 is formed by applying a coating precursor slurry 14 onto a surface 13 of a component 12. For example, the coating precursor slurry 14 can be applied to the surface 13 of the component 12 during the original manufacture of the component 12 via any suitable process, including but not limited to spraying, brushing, tumbling, spin coating, or dipping processes. Once applied, dried, cured, and thermally treated, the resulting lubricated component 10 normally requires minimal or no maintenance/repair/replacement in use. In one embodiment, the coating precursor slurry 14 may also be provided as a paste or spray or film that can be applied as a touch-up to extend and improve the coating effectiveness in service. Thus, the coating precursor slurry 14 can be applied to a new, original part or to an existing component as part of a repair or service.

In one embodiment, the coating precursor is a slurry 14 composed of the organic binder dissolved in a solvent formulated to coat the component in the manner of a paint, an inorganic binder (e.g., including an ammonium phosphate, a barium-containing compound, and/or a nickel-containing compound), and active elements (e.g., Mo and/or Te) that provide the coating with its lubrication and anti-seize properties.

I. Organic Binder

The organic binder allows the active ingredients of the coating to be applied to and strongly adhere to the component at room temperature. The organic binder serves to form a film coating on the component 12 when applied, and to bind all of the other components onto the component and together and to allow the coating to be applied to components in the manner of paint (brush, dip, spray, roll, tumble, etc.). However, the organic binder burns off during an intermediate thermal treatment at between about 200° C. and about 300° C. prior to the final thermal treatment of the coating (e.g., at about 538° C. to about 600° C.). The organic constituents of the binder decompose during the high temperature thermal treatment of the dry lubricant composition/coating and the resulting dry lubricant composition/coating is substantially free from the molecular components of the organic binder. For example, a thermal treatment can be in the temperature range of between about 200° C. and about 600° C., such as about 250° C. to about 500° C., for a sufficient time to burn off the organic binder (e.g., for about 0.5 hours to about 24 hours). The thermal treatment selected from this temperature and time range is dependent on the temperature capability of the component being coating.

In one embodiment, the organic binder includes a polymeric component, a hardening component, and a solvent. In one embodiment, the polymeric component includes a linear chain phenol-formaldehyde epoxy polymer with the hardening reagent (i.e., cross-linking compound) including hexamethylenetetramine.

For example, in one particular embodiment, the organic binder includes a linear chain phenol-formaldehyde resin (e.g., a Novolac, which is a phenol-formaldehyde resin with a formaldehyde to phenol molar ratio of less than one) that is mechanically dissolved (e.g., via ball milling, thixotropically mixing, or other shear mixing methods) in a solvent (e.g., an alcohol or glycol solvent) with a hardening reagent (e.g., hexamethylenetetramine). In one embodiment, ethanol and/or ethylene glycol are examples of two solvents that can be used.

In one embodiment, the coating precursor slurry includes about 0.5% to about 7.5% by weight of the organic binder. In one embodiment, for instance, the coating precursor includes, by weight, about 0.5% to about 5% of the polymeric component and greater than 0% to about 2.5% of the hardening agent. For example, the coating precursor may include, by weight, about 0.5% to about 5% of a linear chain epoxy polymer and greater than 0% to about 2.5% of the hexamethylenetetramine.

II. Inorganic Binder

As stated, the inorganic binder includes, in one particular embodiment, an ammonium phosphate, a barium-containing compound, and/or a nickel-containing compound. Materials containing Al, Ba, and Ni may be described as secondary active elements in that they give the resulting high temperature dry film anti-seize lubricant coating some of its lubricating and anti-seize properties. That is, these elements can react with compounds in the environment to which the coated component will be exposed or with other compound and elements in the high temperature dry film lubricant. As examples, Ni can form a complex oxides with Mo (NiO—$MoO_3$) that act as lubricants, and Ba likewise can getter sulfates and then act as a lubricant as $BaSO_4$. In one embodiment, these secondary active ingredients are added as an ethanol and water based solution containing aluminum nitrate nonahydrate $Al(NO_3)_3$, a barium-containing organic compound (e.g., barium acetate, $Ba(CH_3OO)_2$), a nickel containing compound (e.g., nickel acetate quadra-hydrate, $Ni(CH_3COO)_2.4H_2O$) and phosphorus pentoxide. The dry film anti-seize lubricant coating is not limited to additions of these examples of secondary active elements and elements that exhibit lubricating or anti-seize properties after reaction with the environment or other elements or compounds in the coating may be used.

The inorganic binder also includes an ammonia polyphosphate. The ammonia polyphosphate in the coating precursor slurry 14 serves as a flame retardant for the coating. In one embodiment, the coating 14 comprises about 5% to about 15% of ammonia polyphosphate (e.g., about 8% to about 12%). Ammonia polyphosphate can be provided as a particle having an average particle size of about 5 μm to about 15 μm (e.g., about 7 μm to about 12 μm).

Generally, the inorganic binder is formed from two parts: a first part that includes an aluminum-phosphorus compound (e.g., aluminum phosphate) and a second part that includes phosphorus pentoxide, one or more optional lubricants, and optionally one or more oxygen getters. In one particular embodiment, this solution is produced by controlled 60° C. reaction between a solution of aluminum nitrate nonahydrate $Al(NO_3)_3$, and phosphorus pentoxide $P_2O_5$ dissolved in a solvent or a combination of solvents, such as ethanol, methanol, methylisobutyl ketone, ethyl acetate, and naptha.

The first part of the inorganic binder includes an aluminum phosphate base produced by the reaction of phosphorus pentoxide (e.g. a molecular formula of $P_4O_{10}$, common name is derived from its empirical formula, $P_2O_5$) with aluminum nitrate nonahydrate $(Al(NO_3)_3.9H_2O)$ dissolved in a combination of solvents, such as ethanol, methanol, methylisobutyl ketone, ethyl acetate, and naptha. In one embodiment, the first part of the inorganic binder includes about 15% to about 30% of the aluminum-nitrogen compound (e.g., about 15% to about 21%), by weight. In one particular embodiment, the aluminum-nitrogen compound is an aluminum nitrate, such as aluminum nitrate nonahydrate $(Al(NO_3)_3.9H_2O)$. The phosphorus pentoxide comprises about 10% to about 20% of the first part of the inorganic binder, by weight.

The second part of the inorganic binder also includes phosphorus pentoxide dissolved in a combination of solvents, such as ethanol, methanol, methylisobutyl ketone, ethyl acetate, and naptha and comprises about 5% to about 8% of the second part of the inorganic binder. The second part may also include secondary active ingredients including about 0.5% to about 3% of a barium-containing organic compound (e.g., about 1% to about 3%) dissolved in water. In one particular embodiment, the barium-containing organic compound includes barium acetate $(Ba(CH_3COO)_2)$. To prepare the second part of the inorganic binder, the barium-containing organic compound is dissolved into a solvent (e.g., water) and is then added to the $P_2O_5$ dissolved in a combination of solvents, such as ethanol, methanol, methylisobutyl ketone, ethyl acetate, and naptha. The other secondary active ingredient of the second part of the inorganic binder includes about 0.5% to about 4% of the nickel-containing organic compound (e.g., about 1% to about 3%). In one particular embodiment, the nickel-containing organic compound includes nickel acetate tetrahydrate $(Ni(CH_3COO)_2.4H_2O)$. The nickel-containing compound can be dissolved into the previously prepared second part precursor Al/Ba containing solution. In one embodiment, the inorganic binder includes a mixture of about 14% to about 18% of the first part, by weight, and about 50% to about 65% of the second part in the high temperature dry film lubricant anti-seize coating.

III. Active Component(s) Containing Mo and Te

In this embodiment, the primary active elements present are the metals Te and Mo, and in particular embodiments, in compound form (molybdenum di-telluride, $MoTe_2$, for example), oxidized forms, and/or base metal forms. Graphite, nitrides, metals, transition metal dichalcogenides ($MX_2$ where M is Mo, W, Nb, Ta, etc., and X is selenium or tellurium), metal oxides, P, Ba and B compounds can also be present as active components in the lubricant coating composition.

Generally, the combination of graphite, the transition metal dichalcogenide $MX_2$ (where M is Mo and X is tellurium), Mo, and Te serve as the primary lubricants in the resulting dry lubricant composition/coating. In one embodiment, the coating precursor slurry includes, by weight, about 1% to about 6% graphite (e.g., about 2% to about 5%, such as about 3% to about 4%). In one particular embodiment, graphite is present in the coating precursor slurry 14 as particles having an average particle size of about 25 μm to about 75 μm (e.g., about 40 μm to about 60 μm, such as about 45 μm to about 50 μm). In one embodiment, the combination of molybdenum and tellurium is in the form of molybdenum ditelluride, $MoTe_2$. For example the coating precursor includes, in one embodiment, about 2% to about 15% molybdenum ditelluride by weight (e.g., about 2% to about 12%).

However, Mo and Te may also be present within the coating precursor slurry, such as in powder form. In one particular embodiment, the coating precursor contains Mo powder about 0.2% to about 3% by weight (e.g., about 0.5% to about 2%) and about 2% to about 15% molybdenum ditelluride by weight (e.g., about 2% to about 12%). In one embodiment, the coating precursor contains Te powder about 0.5% to about 6% by weight (e.g., about 1% to about 3%) and about 1% to about 6% molybdenum ditelluride by weight (e.g., about 2% to about 5%).

For example, in one particular embodiment, the coating precursor slurry contains Te powder about 1% to about 4% by weight (e.g., about 1% to about 3%), Mo powder about 0.2% to about 3% by weight (e.g., about 0.5% to about 1.5%), and about 1% to about 6% molybdenum ditelluride by weight (e.g., about 2% to about 5%).

In one particular embodiment, the coating precursor slurry contains Te powder about 1% to about 6% by weight (e.g., about 2% to about 5%) and Mo powder about 0.5% to about 3% by weight (e.g., about 1% to about 2.5%).

In one particular embodiment, molybdenum ditelluride, Mo, and/or Te are present in the coating precursor slurry 14 as particles having an average particle size of about 0.5 μm to about 3 μm (e.g., about 1.5 μm to about 2.5 μm). Graphite, molybdenum ditelluride, Te, and Mo can be milled (e.g., using ball milling) to the desired particle size. For example, such powders can be milled in smaller batch sizes and then combined to the required quantity, or can be milled in larger batch sizes and stored at room temperature.

The solvent in the coating precursor slurry 14 can include, in one embodiment, a polar solvent or a combination of polar solvents, such as ethanol, water, etc. As with the organic binder, the solvent generally burns off during thermal treatment of the dry lubricant composition/coating, such that the resulting dry lubricant composition/coating is substantially free from the solvent. Hence, the resulting dry lubricant composition/coating is referred to as "dry."

IV. Forming the Coating Precursor Slurry

Such a coating precursor slurry 14 can be formed by mixing together several components and other solutions to form the coating precursor slurry 14. The precursor slurry is composed of two separately formulated solutions: solution A and solution B. For example, solution A can be formed by mixing as separate solutions, an aluminum-containing nitrogen compound (e.g., aluminum nitrate) solubilized in a first solvent (e.g., a combination of solvents, such as ethanol, methanol, methylisobutyl ketone, ethyl acetate, and naptha) with phosphorus pentoxide solubilized in the first solvent (e.g., a combination of solvents, such as ethanol, methanol, methylisobutyl ketone, ethyl acetate, and naptha). Additionally, solution B can be formed from a mixture of three solutions: a barium-containing organic compound (e.g., barium acetate) solubilized in a second solvent (e.g., water); mixed into a water-based solution of an aluminum-containing nitrogen compound (e.g., aluminum nitrate) and a nickel-containing organic compound (e.g., nickel acetate tetrahydride) in the solvent (e.g., water); and then mixed into a solution of phosphorus pentoxide solubilized in the first solvent (e.g., a combination of solvents, such as ethanol, methanol, methylisobutyl ketone, ethyl acetate, and naptha). In one embodiment, the solution A includes, by weight, about 15% to about 25% of the aluminum-containing nitrogen compound (e.g., about 17% to about 22%), about 10% to about 20% of phosphorus pentoxide (e.g., about 13% to about 17%), and about 55% to about 75% of the first solvent (e.g., about 60% to about 70%) such as a combination of solvents, such as ethanol, methanol, methylisobutyl ketone, ethyl acetate, and naptha.

In one embodiment, the solution B is a mixture of three solutions: the first which includes, by weight, a mixture of about 9% to about 20% phosphorus pentoxide (e.g., about 10% to about 14%) in about 75% to about 95% of a combination of solvents, such as ethanol, methanol, methylisobutyl ketone, ethyl acetate, and naptha; with a second solution of about 1% to about 6% by weight of the barium-containing organic compound (e.g., about 2% to about 5%) dissolved in a second solvent (e.g., about 7% to about 14% water); and a third solution consisting of about 3% to about 7% of the aluminum-containing nitrogen compound (e.g., about 4% to about 6%), and about 1% to about 6% of the nickel-containing organic compound (e.g., about 2% to about 5%) in a second solvent (e.g., about 7% to about 14% water).

Then, solution A and solution B can be formed into the coating precursor slurry 14 by mixing with an ammonia polyphosphate, an organic binder, graphite, and a combination of molybdenum and tellurium (e.g., in the form of molybdenum ditelluride). For example, the coating precursor slurry can be formed by mixing, by weight, about 10% to about 25% of solution A (e.g., about 10% to about 20%), about 45% to about 65% of solution B (e.g., about 50% to about 70%), about 5% to about 15% of the ammonia polyphosphate (e.g., about 8% to about 12%), about 1% to about 6% of the organic binder (e.g., about 2% to about 5%), about 1% to about 6% of graphite (e.g., about 2% to about 4%), and about 3% to about 15% of a combination of molybdenum and tellurium (e.g., in the form of molybdenum ditelluride) and/or the oxides of molybdenum and tellurium (e.g., about 4% to about 12%).

V. Applying Slurry to Component

Figure 2:
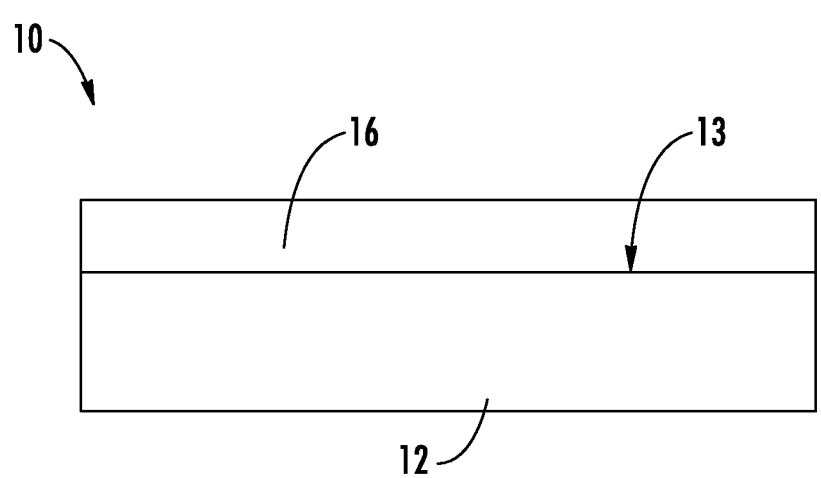
FIG. 2 shows a dried coating precursor after heating the coating precursor slurry of FIG. 1 on the surface of the component of FIG. 1.
Figure 3:
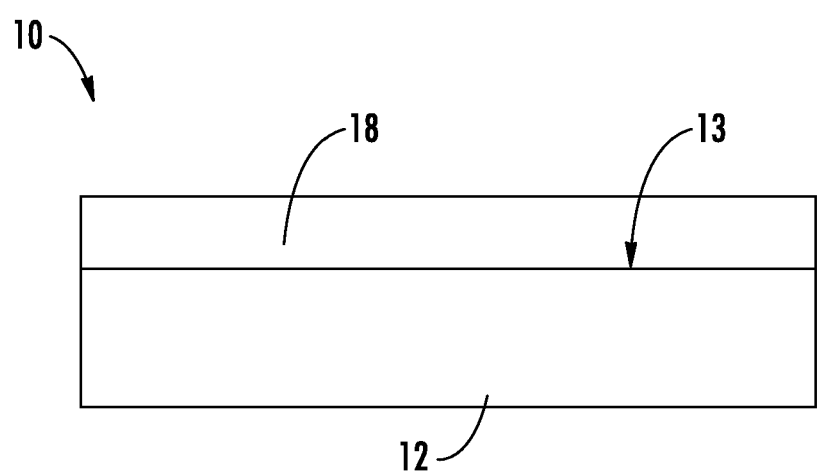
FIG. 3 shows a dry film anti-seize lubricant coating after curing the dried coating precursor of FIG. 2 on the surface of the component of FIG. 1.

After formation of the coating precursor slurry 14 and application to the surface 13 of the component 12 (e.g., via dipping, spin casting, spraying, brushing, etc.), the coating precursor slurry 14 can be dried by heating to a drying temperature of about 220° C. to about 260° C. so as to remove substantially all of the solvent to form a dried coating precursor 16, as shown in FIG. 2. Then, the dried coating precursor 16 on the component 12 can be heated to a first thermal treatment to burn off the organic materials (e.g., about 200° C. and about 300° C.), and then heated to a curing temperature of about 525° C. to about 600° C. to cure the dried coating precursor 16 and to form the dry film lubricant coating 18, as shown in FIG. 3. As such, the dried coating precursor 18 can be cured to harden the aluminum phosphate binder, and remove any organic resins or other organic material.

The resulting dry film lubricant coating 18 is applied, in particular embodiments, to a thickness of about 0.1 mm or less (e.g., about 10 μm to about 100 μm). Additionally, the dry film lubricant coating 18 can have a relatively constant thickness (i.e., a uniform coating) that varies about 10% or less in thickness across the surface of the component.

Figure 4:
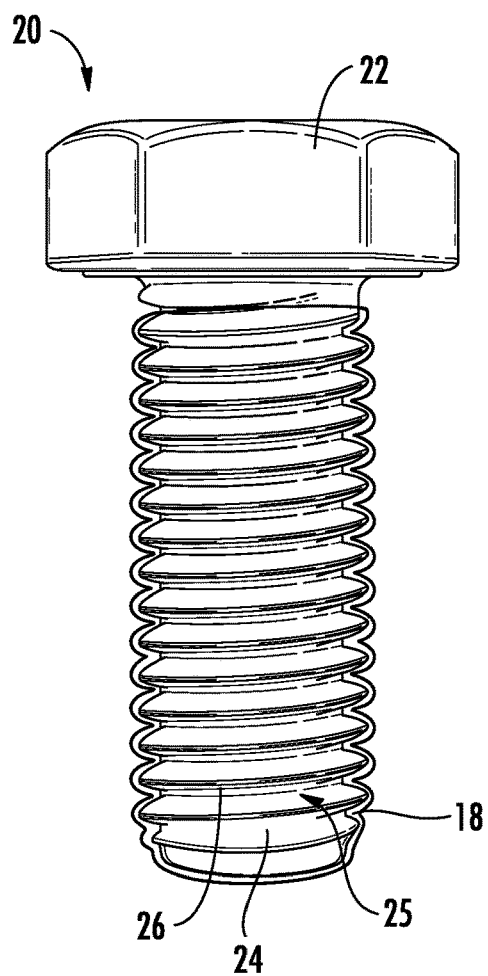
FIG. 4 shows an exemplary threaded component having a dry film anti-seize lubricant coating thereon.
Figure 5:
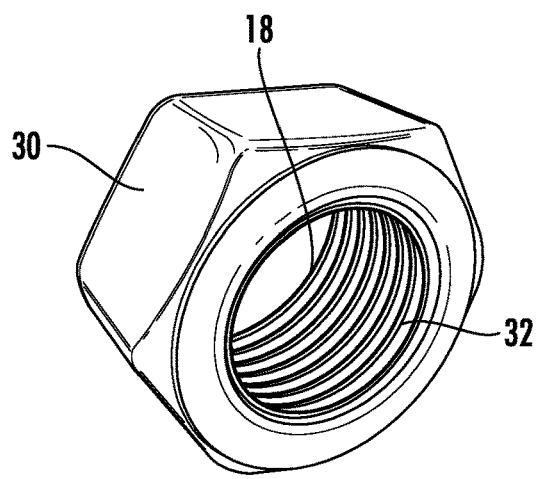
FIG. 5 shows another exemplary threaded component having a dry film anti-seize lubricant coating thereon.

In certain embodiments, the dry film lubricant anti-seize coating 18 can be used as an anti-seize coating for screws, nuts, bolts, and similar components. For example, FIG. 4 shows a bolt 20 having a head 22 and a threaded body 24 defining threads 26. The dry film lubricant coating 18 is shown applied onto the surface 25 of the threaded body 24. Although shown as applied onto the male portion of such a connection, the dry film lubricant coating 18 can also be applied (additionally or alternatively) onto the surfaces of the female component of the attachment mechanism. For example, it is desirable to coat the threads and/or head bearing surfaces of nuts and bolts with a high temperature capable dry film lubricant coating for use in turbine engines. FIG. 5 shows an exemplary nut 30 having threads 32 with coating 18 thereon. Such a coating is intended to improve the galling and seizing of bolts and nuts and to improve the corrosion resistance of these parts in a turbine engine operating environment. The coatings seal and protect the coated material from the corrosive gases and contamination common to a turbine engine environment.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A coating precursor slurry, comprising:
   an organic binder comprising a polymeric component and a hardening reagent;
   an inorganic binder comprising an aluminum-nitrogen compound, a barium-containing organic compound, a nickel-containing organic compound, an ammonia polyphosphate, and phosphorus pentoxide;
   active components comprising Mo, Te, and graphite; and
   a solvent.

2. The coating precursor slurry of claim 1, wherein Mo is present in the slurry as molybdenum powder, a molybdenum telluride compound, a molybdenum oxide, or a mixture thereof; and wherein Te is present in the slurry as tellurium powder, a molybdenum telluride compound, a tellurium oxide, or a mixture thereof.

3. The coating precursor slurry of claim 1, wherein the coating precursor slurry comprises, by weight, about 4% to about 10% of the aluminum-nitrogen compound, and wherein the aluminum-nitrogen compound comprises aluminum nitrate.

4. The coating precursor slurry of claim 1, wherein the coating precursor slurry comprises, by weight, about 0.5% to about 4% of the barium-containing organic compound.

5. The coating precursor slurry of claim 1, wherein the barium-containing organic compound comprises barium acetate.

6. The coating precursor slurry of claim 1, wherein the coating precursor slurry comprises, by weight, about 0.5% to about 4% of the nickel-containing organic compound.

7. The coating precursor slurry of claim 1, wherein the nickel-containing organic compound comprises nickel acetate tetrahydride.

8. The coating precursor slurry of claim 1, wherein the coating precursor slurry comprises, by weight, about 5% to about 15% of ammonia polyphosphate.

9. The coating precursor slurry of claim 1, wherein the coating precursor slurry comprises, by weight, about 5% to about 15% of phosphorus pentoxide.

10. The coating precursor slurry of claim 1, wherein the organic binder comprises hexamethylenetetramine and a linear chain epoxy polymer.

11. The coating precursor slurry of claim 10, wherein the coating precursor comprises, by weight, greater than 0% to about 2.5% of the hexamethylenetetramine and about 0.5% to about 5% of the linear chain epoxy polymer.

12. The coating precursor slurry of claim 1, wherein the coating precursor comprises, by weight, about 1% to about 6% graphite, and wherein graphite is present in the coating precursor slurry as particles having an average particle size of about 25 µm to about 75 µm.

13. The coating precursor slurry of claim 1, wherein the combination of molybdenum and tellurium is molybdenum ditelluride, and wherein the coating precursor includes, by weight, about 2% to about 15% molybdenum ditelluride.

14. The coating precursor slurry of claim 1, wherein the coating precursor includes, by weight, about 0.2% to about 3% molybdenum powder and about 2% to about 15% molybdenum ditelluride.

15. The coating precursor slurry of claim 13, wherein the molybdenum ditelluride, molybdenum powder, and/or tellurium powder are present in the coating precursor slurry as particles having an average particle size of about 0.1 µm to about 3 µm.

16. The coating precursor slurry of claim 1, wherein the solvent comprises ethanol and/or water.

17. The coating precursor slurry of claim 1, wherein the coating precursor slurry comprises, by weight, about 4% to about 8% of the aluminum-nitrogen compound, wherein the aluminum-nitrogen compound comprises aluminum nitrate; about 1% to about 3% of the barium-containing organic compound, wherein the barium-containing organic compound comprises barium acetate; about 1% to about 3% of the nickel-containing organic compound, wherein the nickel-containing organic compound comprises nickel acetate tetrahydride; about 8% to about 12% of the ammonia polyphosphate; about 7% to about 11% of phosphorus pentoxide; about 2% to about 5% graphite.

18. The coating precursor slurry of claim 17, wherein the organic binder comprises hexamethylenetetramine and a linear chain epoxy polymer an organic binder, and wherein the combination of molybdenum and tellurium is molybdenum ditelluride, and further wherein the coating precursor includes, by weight, about 8% to about 12% molybdenum ditelluride, and further wherein the coating precursor includes, by weight, about 0.2% to 3% molybdenum powder, and further wherein the coating precursor includes, by weight, about 0.5 to 6% tellurium powder, and further wherein the solvent comprises ethanol and water.

19. A method of applying a lubricant composition onto a component, the method comprising:
   applying the coating precursor slurry of claim 1 onto a surface of the component;
   heating the coating precursor slurry on the component to a drying temperature of about 220° C. to about 260° C. to remove any solvent to form a dried coating precursor; and
   heating the dried coating precursor on the component to a curing temperature of about 525° C. to about 600° C. to cure the dried coating precursor.

20. A method of forming a coating precursor slurry, the method comprising:
   mixing a first solution and a second solution to form a slurry, wherein the first solution comprises an aluminum-nitrogen compound and phosphorus pentoxide in a first solvent, and wherein the second solution comprises phosphorus pentoxide, a barium-containing organic compound, an aluminum-nitrogen compound, and a nickel-containing organic compound in a second solvent; and
   adding an ammonia polyphosphate, an organic binder, graphite, and molybdenum ditelluride to the slurry.

* * * * *